United States Patent
Sun et al.

(10) Patent No.: US 12,135,841 B2
(45) Date of Patent: Nov. 5, 2024

(54) GESTURE INTERACTION METHOD AND SYSTEM BASED ON ARTIFICIAL REALITY

(71) Applicant: Qingdao Pico Technology Co., Ltd., Shandong (CN)

(72) Inventors: Fei Sun, Beijing (CN); Haitao Yu, Beijing (CN); Tao Wu, Beijing (CN); Achuan Li, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/400,624

(22) Filed: Dec. 29, 2023

(65) Prior Publication Data

US 2024/0134461 A1 Apr. 25, 2024
US 2024/0231503 A9 Jul. 11, 2024

Related U.S. Application Data

(63) Continuation of application No. PCT/CN2022/081494, filed on Mar. 17, 2022.

(30) Foreign Application Priority Data

Aug. 12, 2021 (CN) ......................... 202110926659.X

(51) Int. Cl.
*G06F 3/01* (2006.01)
*G06F 3/00* (2006.01)
(Continued)

(52) U.S. Cl.
CPC .............. *G06F 3/017* (2013.01); *G06F 3/005* (2013.01); *G06F 3/011* (2013.01);
(Continued)

(58) Field of Classification Search
CPC ............ G06F 3/04815; G06F 3/04842; G06F 3/0486; G06F 3/04812; G06F 3/04892;
(Continued)

(56) References Cited

U.S. PATENT DOCUMENTS 11,086,406 B1 * 8/2021 Ravasz ................ G06F 1/1686
2015/0234467 A1 8/2015 Tachibana
(Continued)

FOREIGN PATENT DOCUMENTS

CN 103229127 A 7/2013
CN 106990840 A 7/2017
(Continued)

OTHER PUBLICATIONS

International Search Report in PCT/CN2022/081494, mailed Jun. 6, 2022, 3 pages.
(Continued)

*Primary Examiner* — Nicholas Ulrich
(74) *Attorney, Agent, or Firm* — Astute IP Law Group

(57) ABSTRACT

Provided are a gesture interaction method and a gesture interaction system based on artificial reality. The method includes: determining a ray formed from a predetermined position of a hand to a finger joint when four fingers form a fist as an operation indication line, an end point of the ray being on the hand; determining a point of intersection between the operation indication line and a display surface in the artificial reality as a position of an operation icon in the artificial reality; controlling the operation icon to move correspondingly in response to detecting that the four fingers form the fist and move, to move the operation icon in the display surface to a target key; and determining, in response to detecting an action of a thumb of the hand touching an index finger, that the operation icon clicks on the target key to complete an interaction.

10 Claims, 3 Drawing Sheets

(51) Int. Cl.
*G06F 3/04815* (2022.01)
*G06F 3/04842* (2022.01)
*G06F 3/0486* (2013.01)

(52) U.S. Cl.
CPC ...... *G06F 3/04815* (2013.01); *G06F 3/04842* (2013.01); *G06F 3/0486* (2013.01)

(58) Field of Classification Search
CPC .......... G06F 3/03; G06F 3/033; G06F 3/0346; G06F 3/0354; G06F 3/017; G06F 3/014; G06F 3/005; G06F 3/011
See application file for complete search history.

(56) References Cited

U.S. PATENT DOCUMENTS

| | | | | |
|---|---|---|---|---|
| 2015/0285623 | A1* | 10/2015 | Tachibana | G01S 7/497 250/341.8 |
| 2016/0124513 | A1 | 5/2016 | Dal Zot et al. | |
| 2016/0170603 | A1 | 6/2016 | Bastien et al. | |
| 2016/0320846 | A1* | 11/2016 | De Michele | G06V 40/107 |
| 2020/0097091 | A1* | 3/2020 | Chou | G06V 40/28 |
| 2020/0225736 | A1 | 7/2020 | Schwarz et al. | |
| 2020/0226814 | A1* | 7/2020 | Tang | G06F 3/0304 |
| 2021/0263593 | A1* | 8/2021 | Lacey | G06F 3/017 |
| 2021/0405760 | A1* | 12/2021 | Schoen | G06F 1/163 |
| 2023/0011453 | A1* | 1/2023 | Pinchon | G06F 3/017 |

FOREIGN PATENT DOCUMENTS

| | | |
|---|---|---|
| CN | 108052202 A | 5/2018 |
| CN | 110515455 A | 11/2019 |
| CN | 112000224 A | 11/2020 |
| CN | 112198962 A | 1/2021 |
| CN | 113190109 A | 7/2021 |
| CN | 113885695 A | 1/2022 |

OTHER PUBLICATIONS

Extended European Search Report for European Patent Application No. 22854891.3, mailed Jul. 23, 2024, 10 pages.
Office Action for Chinese Patent Application No. 202110926659.X, mailed Sep. 20, 2024, 21 pages.

* cited by examiner

GESTURE INTERACTION METHOD AND SYSTEM BASED ON ARTIFICIAL REALITY

CROSS-REFERENCE TO RELATED APPLICATIONS

The present application is a continuation of International Application No. PCT/CN2022/081494 filed on Mar. 17, 2022, which claims priority to Chinese patent application No. 202110926659.X, entitled "GESTURE INTERACTION METHOD AND SYSTEM BASED ON ARTIFICIAL REALITY" and filed on Aug. 12, 2021, the entire content of which is incorporated herein by reference.

TECHNICAL FIELD

The present disclosure relates to the technical field of virtual reality, and more particularly to a gesture interaction method and system based on artificial reality.

BACKGROUND

Due to advancements in technology and the diversification of market demand, virtual reality systems are becoming more and more popular for use in many fields such as computer games, health and safety, industry and educational training. To name a few, mixed virtual reality systems are being integrated into every corner of life such as mobile communication devices, gaming machines, personal computers, cinemas, theme parks, university laboratories, student classrooms, hospital exercise rooms, etc.

With the development in the artificial reality field, it is indispensable for users to interact with the contents in VR, AR, and MR scenes. In the meantime, the user-friendly "bare hand" gesture interaction has become a trend in today's development. At present, most of the existing gesture interactions in this scene are single-finger index finger "clicking" gestures, thumb and index finger "pinching" gestures, make-a-fist "determining" gestures, etc. However, the interactive gestures of "clicking" with a single-hand index finger, "pinching" with a thumb and an index finger, and "determining" by making a fist require high accuracy of gesture recognition. Therefore, the human and financial investment is bound to be large. Although the accuracy of gesture recognition is high for interactive gestures, the interaction accuracy and experience are relatively poor.

Therefore, there is an urgent need for a gesture interaction method based on artificial reality, which can reduce human and financial investment, improve gesture recognition accuracy, and improve user experience.

SUMMARY

In view of the above-mentioned problems, it is an object of the present disclosure to provide a gesture interaction method based on artificial reality, to solve the problems that the interactive gestures of "clicking" with a single-hand index finger, "pinching" with a thumb and an index finger, and "determining" by making a fist require high accuracy of gesture recognition; therefore, the human and financial investment is bound to be large; although the accuracy of gesture recognition is high for interactive gestures, the interaction accuracy and experience are relatively poor.

The present disclosure provides a gesture interaction method based on artificial reality, including:
  determining a ray formed from a predetermined position of a hand to a finger joint of the hand in a state in which four fingers of the hand form a fist as an operation indication line, an end point of the ray being the predetermined position of the hand;
  determining a point of intersection between the operation indication line and a display surface in the artificial reality as a position of an operation icon in the artificial reality;
  controlling the operation icon to move correspondingly in response to detecting that the four fingers of the hand form the fist and move, to move the operation icon in the display surface to a target key; and
  determining, in response to detecting an action of a thumb of the hand touching an index finger of the hand, that the operation icon clicks on the target key to complete an interaction.

Preferably, the predetermined position of the hand is a wrist joint; and the finger joint is a joint of the index finger.

Preferably, controlling the operation icon to move correspondingly includes: controlling the operation icon to move according to a moving trajectory of the movement of the four fingers that form the fist.

Preferably, said determining, in response to detecting the action of the thumb of the hand touching the index finger of the hand, that the operation icon clicks on the target key to complete the interaction includes:
  determining an index finger joint plane based on joint positions of the index finger;
  determining a distance between a distal finger pulp of the thumb and the index finger joint plane as a thumb-index-finger spacing;
  controlling the operation icon to click on the target key, in response to detecting that the distal finger pulp of the thumb approaches the index finger joint plane and the thumb-index-finger spacing is smaller than a predetermined clicking distance threshold; and
  in response to detecting that the thumb is lifted, the distal finger pulp gets away from the index finger joint plane, and the thumb-index-finger spacing is greater than a predetermined effective distance threshold, controlling to complete the action of the operation icon clicking on the target key, and enabling the action of the operation icon clicking on the target key to become effective, to complete some interactive action.

Preferably, the method further includes: determining, in response to detecting that the hand moves when the thumb-index-finger spacing is smaller than the clicking distance threshold, that an instruction to drag and slide an to-be-dragged-and-slid interface is received, the to-be-dragged-and-slid interface being determined based on a position of the hand when the thumb-index-finger spacing is smaller than the clicking distance threshold; and determining, in response to detecting that the hand stops moving, the distal finger pulp gets away from the index finger joint plane, and the thumb-index-finger spacing is greater than the predetermined effective distance threshold, that an instruction to stop dragging and sliding the to-be-dragged-and-slid interface is received.

Preferably, the index finger joint plane includes all points covered by a plane formed between a distal finger tip of the index finger and an interphalangeal joint of the index finger, between two interphalangeal joints of the index finger, and between an interphalangeal joint and a metacarpal joint of the index finger.

Preferably, the clicking distance threshold is equal to the effective distance threshold.

The present disclosure further provides a gesture interaction system based on artificial reality, implementing the gesture interaction method based on artificial reality as described above and including a camera configured to capture a motion posture of the hand, a display configured to display an interaction page, and a processor connected to the camera and the display. The processor includes:

an indication configuration unit configured to determine a ray formed from a predetermined position of a hand to a finger joint of the hand in a state in which four fingers of the hand form a fist as an operation indication line, wherein an end point of the ray is the predetermined position of the hand;

an icon configuration unit configured to determine a point of intersection between the operation indication line and a display surface in the artificial reality as a position of an operation icon in the artificial reality;

a control operation unit configured to control the operation icon to move correspondingly, in response to detecting that the four fingers of the hand form the fist and move, to move the operation icon in the display surface to a target key, wherein display is configured to display the display surface; and a response interaction unit configured to determine, in response to detecting an action of the thumb of the hand touching the index finger, that the operation icon clicks on the target key to complete the interaction.

Preferably, the response interaction unit comprises an action unit and an effectuation unit, and the response interaction unit is specifically configured to, when determining that the operation icon clicks on the target key to complete the interaction in response to detecting the action of the thumb of the hand touching the index finger of the hand:

determine an index finger joint plane based on joint positions of the index finger;

determine a distance between a distal finger pulp of the thumb and the index finger joint plane as a thumb-index-finger spacing;

trigger the action unit in response to detecting that the distal finger pulp of the thumb approaches the index finger joint plane and the thumb-index-finger spacing is smaller than a predetermined clicking distance threshold, wherein the action unit is configured to control the operation icon to click on the target key; and trigger the effectuation unit in response to detecting that the thumb is lifted, the distal finger pulp gets away from the index finger joint plane, and the thumb-index-finger spacing is greater than a predetermined effective distance threshold, wherein the effectuation unit is configured to control to complete the action of the operation icon clicking on the target key, and enable the action of the operation icon clicking on the target key to become effective, to complete one interactive action.

Preferably, the system further includes a dragging and sliding unit. The dragging and sliding unit is configured to: determine, in response to detecting that the hand moves when the thumb-index-finger spacing is smaller than a predetermined clicking distance threshold, that an instruction to drag and slide an to-be-dragged-and-slid interface is received, the to-be-dragged-and-slid interface being determined based on a position of the hand when the thumb-index-finger spacing is smaller than the clicking distance threshold; and determine, in response to detecting that the hand stops moving, the distal finger pulp of the thumb gets away from the index finger joint plane, and the thumb-index-finger spacing is greater than a predetermined effective distance threshold, that an instruction to stop dragging and sliding the to-be-dragged-and-slid interface is received.

It can be seen from the above technical solutions that, in the gesture interaction method and system based on artificial reality provided by the present disclosure, a ray formed from a predetermined position of a hand to a finger joint of the hand in a state in which four fingers of the hand form a fist is determined as an operation indication line, wherein an end point of the ray is the predetermined position of the hand; a point of intersection between the operation indication line and a display surface in the artificial reality is determined as a position of an operation icon in the artificial reality; the operation icon is controlled to move correspondingly in response to detecting that the four fingers of the hand form the fist and move, to move the operation icon in the display surface to a target key; and it is determined, in response to detecting an action of a thumb of the hand touching an index finger of the hand, that the operation icon clicks on the target key to complete interaction. With this process, the thumb touching any point of the index finger can achieve a clicking operation, with low precision requirements, thereby reducing manpower and financial resources. Moreover, due to the low precision requirements, it is easy to perform the clicking operation, greatly improvings the user interaction experience.

BRIEF DESCRIPTION OF DRAWINGS

With the more comprehensive understanding to the present disclosure with reference to the following description taken in conjunction with the accompanying drawings, other objects and results of the present disclosure will become more apparent and easily understood. In the drawings.

DESCRIPTION OF EMBODIMENTS

Currently, the interactive gestures of "clicking" with a single-hand index finger, "pinching" with a thumb and an index finger, and "determining" by making a fist require high accuracy of gesture recognition. Therefore, the human and financial investment is bound to be large. Although the accuracy of gesture recognition is high for interactive gestures, the interaction accuracy and experience are relatively poor.

To address the above-mentioned problems, the present disclosure provides a gesture interaction method and system based on artificial reality, and specific embodiments of the present disclosure will be described in detail below with reference to the accompanying drawings.

Figure 3:
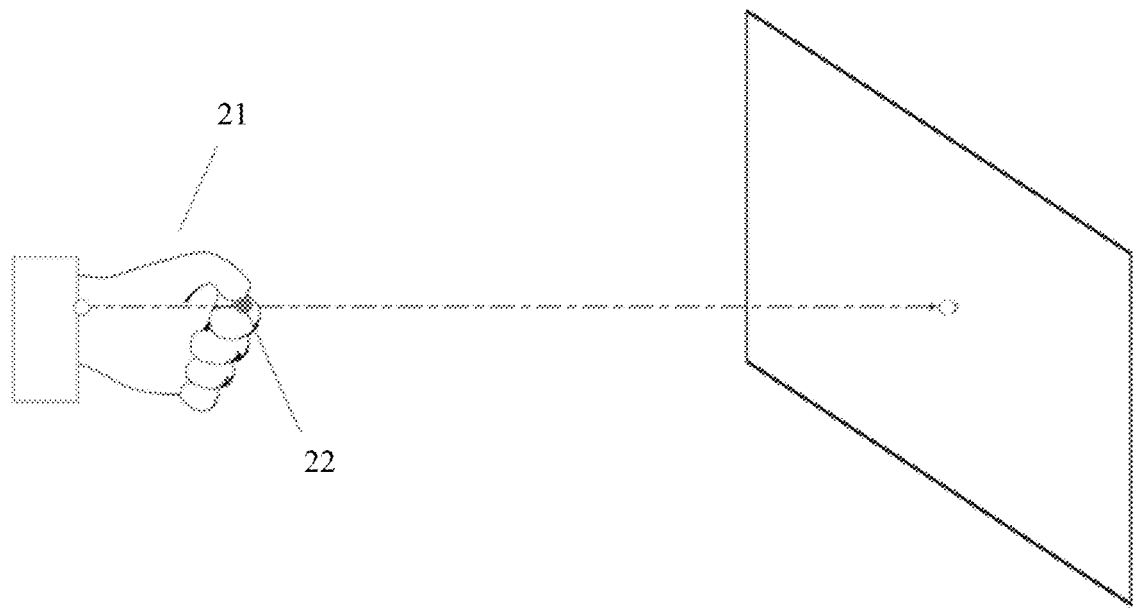
FIG. 3 is a schematic diagram of a thumb touching an index finger in a gesture interaction method based on artificial reality according to an embodiment of the present disclosure.
Figure 4:
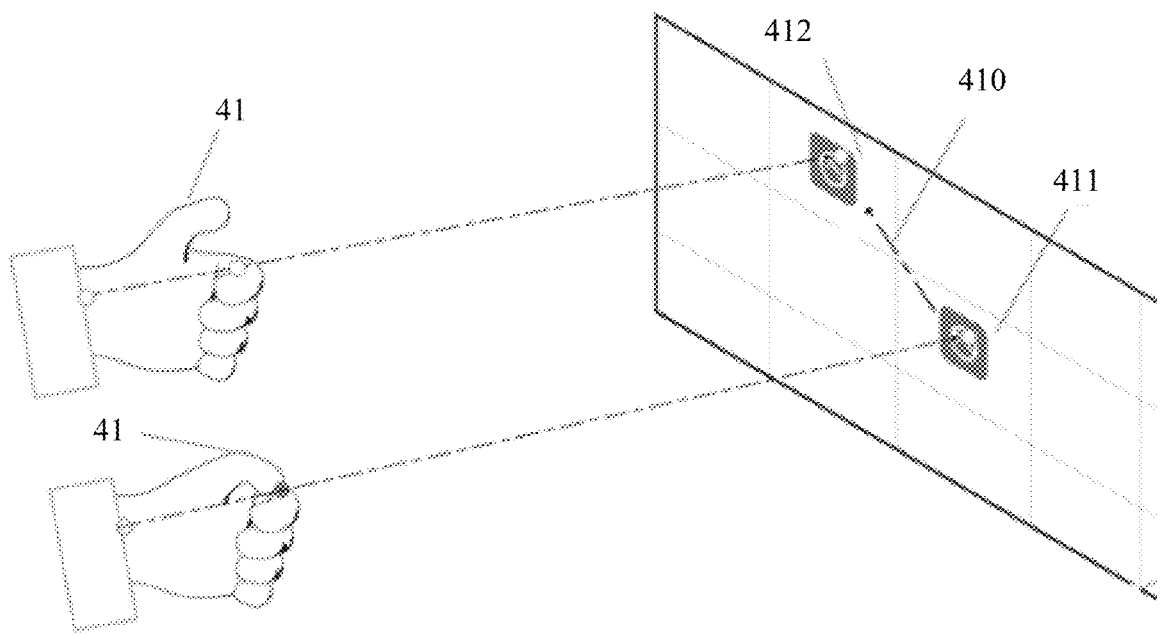
FIG. 4 is a schematic diagram of a dragging or sliding interaction in a gesture interaction method based on artificial reality according to an embodiment of the present disclosure.
Figure 5:
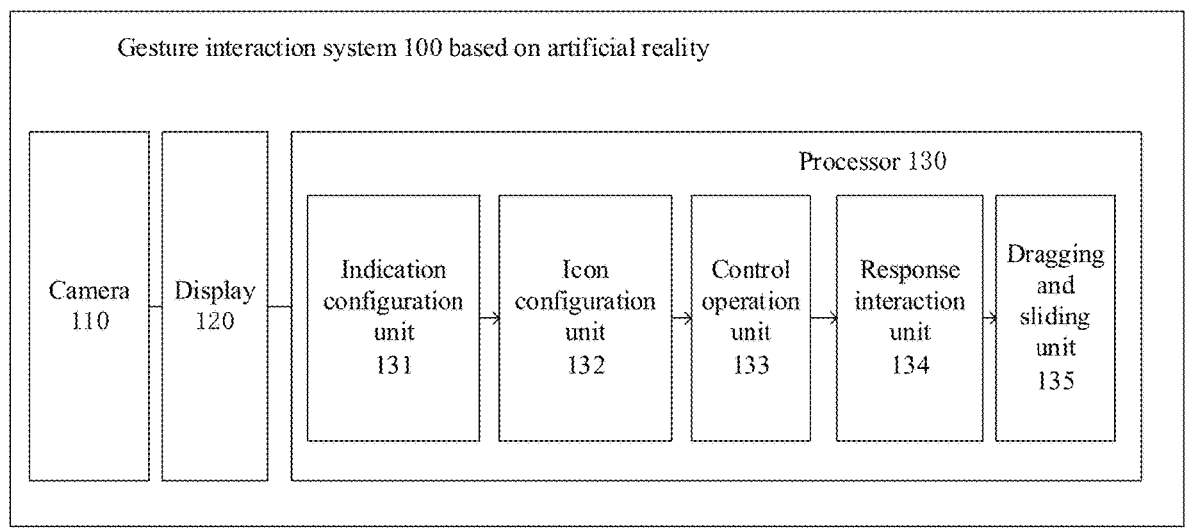
FIG. 5 is a schematic diagram of a gesture interaction system based on artificial reality according to an embodiment of the present disclosure.

In order to illustrate the gesture interaction method and system based on artificial reality provided by the present disclosure, FIGS. 1, 2, 3, and 4 exemplarily show the gesture interaction method based on artificial reality according to the embodiments of the present disclosure, and FIG. 5 exemplarily shows a gesture interaction system based on artificial reality according to an embodiment of the present disclosure.

The description of exemplary embodiments below is actually merely illustrative and is in no way intended to limit the present disclosure and applications or uses thereof. Techniques and devices known to those of ordinary skill in the relevant art may not be discussed in detail, but the techniques and devices should be considered as part of the description where appropriate.

Figure 1:
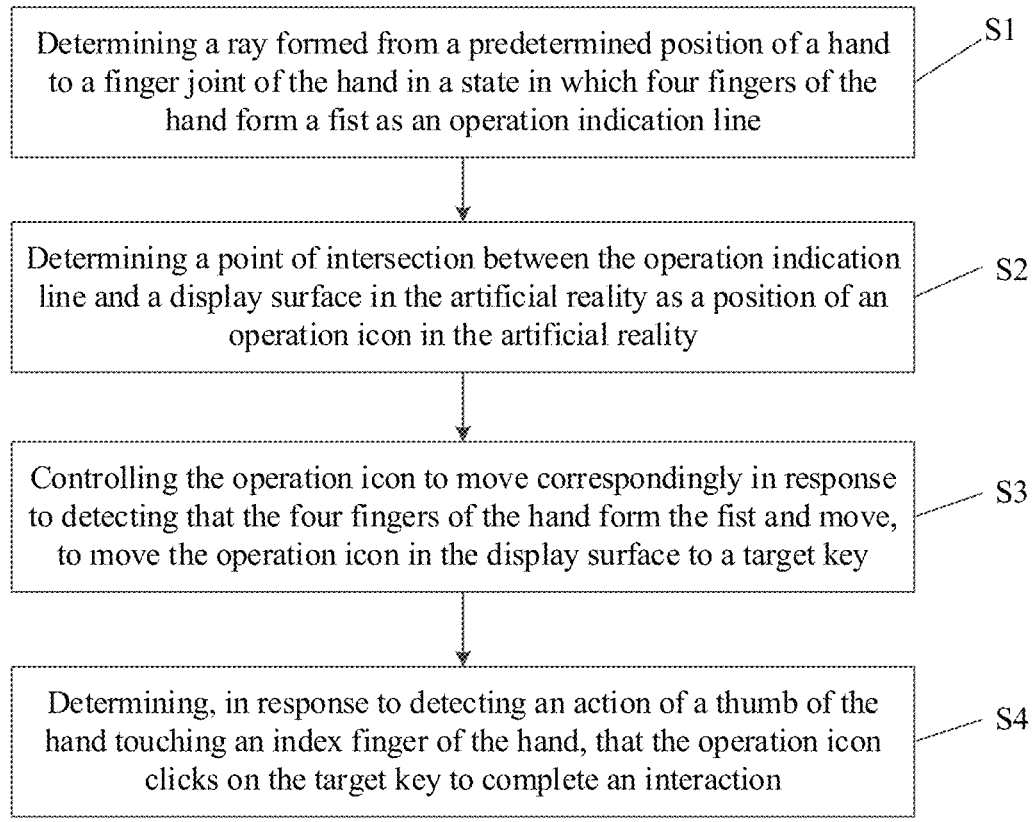
FIG. 1 is a flowchart of a gesture interaction method based on artificial reality according to an embodiment of the present disclosure.

As shown in FIG. 1, a gesture interaction method based on artificial reality according to an embodiment of the present disclosure includes operations at blocks S1 to S4.

At S1, a ray formed from a predetermined position of a hand to a finger joint of the hand in a state in which four fingers of the hand form a fist is determined as an operation indication line. Here, an end point of the ray is the predetermined position of the hand.

At S2, a point of intersection between the operation indication line and a display surface in the artificial reality is determined as a position of an operation icon in the artificial reality.

At S3, the operation icon is controlled to move correspondingly in response to detecting that the four fingers of the hand form the fist and move, to move the operation icon in the display surface to a target key.

At S4, it is determined, in response to detecting an action of a thumb of the hand touching an index finger of the hand, that the operation icon clicks on the target key to complete interaction.

Figure 2:
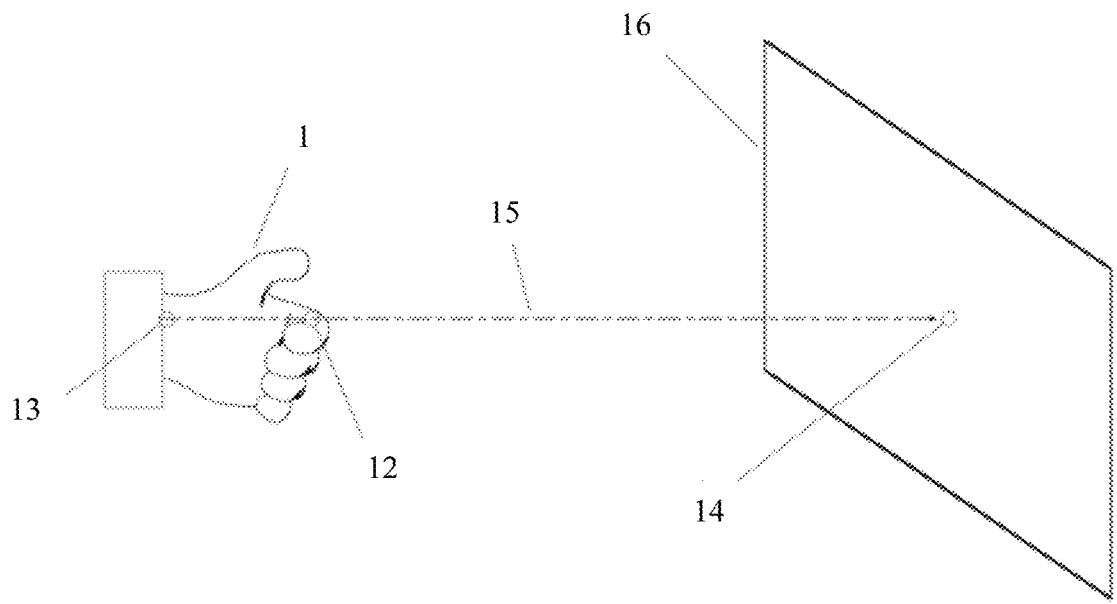
FIG. 2 is a schematic diagram illustrating the relationship between a hand and a display surface displayed on a display in a gesture interaction method based on artificial reality according to an embodiment of the present disclosure.

As shown in FIG. 1 and FIG. 2 together, block S1 is the process of determining a ray formed from a predetermined position of a hand to a finger joint of the hand in a state in which four fingers of the hand form a fist as an operation indication line. Here, an end point of the ray is the predetermined position of the hand. In the present embodiment, when the four fingers are tightly held, and the thumb 11 can be in a vertical state or a fist clenching state, which will not be limited herein. The predetermined position of the hand and the position of the finger joint are not limited. In the present embodiment, the predetermined position of the hand is a wrist joint 13, and the finger joint is an index finger joint 12, so that the operation indication line 15 is formed with the wrist joint 13 as the end point. The operation indication line may be or may not be displayed in an artificial reality scene. In the present embodiment, the operation indication line is transparent and not displayed, and since the ray is determined by the wrist joint and the index finger joint, the operation indication line is mostly horizontal, so as to facilitate the user to directly manipulate interaction by hand at a later stage.

As shown in FIG. 1 and FIG. 2 together, block S2 is to determine the point of intersection between the operation indication line and the display surface in the artificial reality as the position of the operation icon of the artificial reality. Even if the operation indication line 15 with the wrist joint 13 as the end point extends towards the display surface 16 and extends to intersect with the display surface 16, and the point of intersection is determined as the position of the operation icon 14, the operation icon may be transparent and colorless, or may be colored. If the operation icon is colored, it may be an identifier of any suitable size, and in the present embodiment, it is a round ball-like icon, so that the user can clearly move the operation icon.

As shown in FIG. 1 and FIG. 2 together, block S3 is a process of controlling, in response to detecting that the four fingers of the hand form the fist and move, the operation icon to move correspondingly, to move the operation icon in the display surface to a target key. In the process, controlling the operation icon to move correspondingly comprises: controlling the operation icon to move according to a moving trajectory of the movement of the four fingers that form the fist. As the hand moves, the operation icon 14 moves correspondingly. For example, in a case where a user faces a display surface and the hand is a left hand, when the left hand moves leftward, rightward, upward, downward, forward, or backward, the icon in the display surface also moves leftward, rightward, upward, downward, forward, or backward as the hand moves from the perspective of the user, enabling the user to flexibly control the position of the operation icon by the hand.

As shown jointly in FIGS. 1 and 3, the action at S4 is a process of determining, in response to detecting an action of a thumb of the hand touching an index finger of the hand, that the operation icon clicks on the target key to complete interaction. The process of the user, by an action of a thumb touching an index finger, making the operation icon click on the target key to complete the interaction, namely, the operation of determining, in response to detecting the action of the thumb of the hand touching the index finger of the hand, that the operation icon clicks on the target key to complete interaction includes actions at S41 to S44.

At S41, an index finger joint plane is determined based on joint positions of the index finger.

At S42, a distance between a distal finger pulp of the thumb and the index finger joint plane is determined as a thumb-index-finger spacing;

At S43, the operation icon is controlled to click on the target key in response to detecting that the distal finger pulp of the thumb approaches the index finger joint plane and the thumb-index-finger spacing is smaller than a predetermined clicking distance threshold.

At S44, in response to detecting that the thumb is lifted, the distal finger pulp gets away from the index finger joint plane, and the thumb-index-finger spacing is greater than a predetermined effective distance threshold, the method proceeds to control to complete the action of the operation icon clicking on the target key, and enable the action of the operation icon clicking on the target key to be effective, to complete one interactive action. Specifically, the joint positions of the index finger refer to the positions of joints in the index finger.

Specifically, if an interactive action of clicking a confirm key or clicking other target keys is to be performed, the thumb is enabled to be as shown in FIG. 3, i.e., the distal finger pulp (the finger pulp at the finger tip) of the thumb 21 is enabled to approach the index finger joint plane 22 so that the thumb-index-finger spacing becomes smaller, even 0. When the thumb-index-finger spacing is smaller than the predetermined clicking distance threshold, the operation icon clicks the target key; in other words, when the thumb 21 clicks on the index finger joint plane 22, the operation icon clicks on the target key, and the specific value of the clicking distance threshold is not limited and can be adjusted at any time. When the clicking action occurs, the thumb is lifted, i.e., the distal finger pulp is enabled to get away from the plane determined by the joints in the index finger. When the thumb-index-finger spacing is greater than the predetermined effective distance threshold, the clicking action is terminated, and the action of clicking the target key by the operation icon is made effective, thus completing the interactive operation completed through one key, such as one clicking, canceling, confirming, etc. The value of the effective distance threshold is not limited, and can be adjusted at any time.

In the embodiments jointly shown in FIGS. 1 and 4, the following actions at S5 and S6 are further included.

At S5, it is determined, in response to detecting that the hand moves when the thumb-index-finger spacing is smaller than the clicking distance threshold, that an instruction to drag and slide a to-be-dragged-and-slid interface is received. The to-be-dragged-and-slid interface is determined based on a position of the hand when the thumb-index-finger spacing is smaller than the clicking distance threshold.

At S6, it is determined, in response to detecting that the hand stops moving, the distal finger pulp gets away from the index finger joint plane, and the thumb-index-finger spacing is greater than the predetermined effective distance threshold, that an instruction to stop dragging and sliding the to-be-dragged-and-slid interface is received.

Optionally, the user may complete the interaction by dragging and sliding. The responding process of completing the interaction by dragging and sliding may include actions at S51 to S54.

At S51, an index finger joint plane is determined based on joint positions of an index finger. Here, the joint positions of the index finger may be positions of joints in the index finger.

At S52, a distance between a distal finger pulp of the thumb 41 and the index finger joint plane is determined as a thumb-index-finger spacing;

At S53, the operation icon is controlled to press the to-be-dragged-and-slid interface in response to detecting that the thumb-index-finger spacing is smaller than a predetermined clicking distance threshold, and the to-be-dragged-and-slid interface is controlled to be dragged or slid along with the movement of the hand in response to detecting that the hand moves when the thumb-index-finger spacing is smaller than the predetermined clicking distance threshold.

At S54, it is determined, in response to detecting that the distal finger pulp gets away from the plane determined by the joints in the index finger when the thumb-index-finger spacing is greater than a predetermined effective distance threshold, that the to-be-dragged-and-slid interface moves to the target position, and the action of the to-be-dragged-and-slid interface moving to the target position is controlled to become effective, thus completing one interactive action of dragging or sliding.

Specifically, as shown in FIG. 4, in the present embodiment, if it is desired to move the to-be-dragged-and-slid interface, it is firstly determined that the distal finger pulp of the thumb 41 approaches the plane determined by the joints in the index finger, i.e., the thumb 41 presses the plane determined by the joints in the index finger, so that the thumb-index-finger spacing becomes smaller; when the thumb-index-finger spacing is smaller than a predetermined clicking distance threshold, i.e., the to-be-dragged-and-slid interface is pressed at a position 411, then the user can move the hand to enable the to-be-dragged-and-slid interface to move from the position 411 to the position 412 along the path 410 along with the movement of the hand; at this moment, the to-be-dragged-and-slid interface has reached the target position 412, and at this moment, it is only necessary to lift the thumb to enable the distal finger pulp to get away from the plane determined by the joints in the index finger; when the thumb-index-finger spacing is greater than the predetermined effective distance threshold, the action of the to-be-dragged-and-slid interface moving to the position 412 immediately becomes effective, to complete one interactive action of dragging or sliding.

In the embodiments shown in FIGS. 1, 2, 3, and 4, the effective distance threshold and the clicking distance threshold have the same value, so that the two thresholds are adjusted together according to a current situation. The plane determined by the joints in the index finger includes all points covered by a plane formed between a distal finger tip of the index finger and an interphalangeal joint of the index finger, between two interphalangeal joints of the index finger, and between an interphalangeal joint and a metacarpal joint of the index finger. That is, the thumb distal finger pulp and the index finger distal finger tip can form a "pressing down" gesture and a "clicking" gesture, and the thumb distal finger pulp and the index finger interphalangeal joint can also form the "pressing down" and "clicking" gestures. The thumb distal finger pulp and the index finger metacarpal joint can also form "pressing down" and the "clicking" gestures. Any point in the plane formed between the thumb finger pulp and the index finger interphalangeal joint, the plane between two index finger interphalangeal joints, and the plane between the index finger interphalangeal joints can achieve the "pressing down" and "clicking" gestures, thereby reducing the accuracy requirements for gesture control and improving the user experience.

It needs to be noted that when a "clicking" or "pressing down" operation is performed via a gesture, and the clicking can click on any target key and to-be-dragged-and-slid interface in the display. This can meet any interactive action whose operation and control page can be found in a display, and the specific operation details will not be elaborated herein.

As described above, the gesture interaction method based on artificial reality provided by the present disclosure includes: determining a ray formed from a predetermined position of a hand to a finger joint of the hand in a state in which four fingers of the hand form a fist as an operation indication line, an end point of the ray being the predetermined position of the hand; determining a point of intersection between the operation indication line and a display surface in the artificial reality as a position of an operation icon in the artificial reality; controlling the operation icon to move correspondingly in response to detecting that the four fingers of the hand form the fist and move, to move the operation icon in the display surface to a target key; and determining, in response to detecting an action of a thumb of the hand touching an index finger of the hand, that the operation icon clicks on the target key to complete interaction. Therefore, the thumb touching any point of the index finger can achieve a clicking operation, with low precision requirements, thereby reducing manpower and financial resources. Moreover, due to the low precision requirements, it is easy to perform the clicking operation, greatly improving the user interaction experience.

As shown in FIG. 5, the present disclosure further provides a gesture interaction system 100 based on artificial reality for implementing the gesture interaction method based on artificial reality as described above. The gesture interaction system 100 based on artificial reality includes a camera 110 configured to capture a motion posture of a hand, a display 120 configured to display an interaction page, and a processor 130 connected to the camera 110 and the display 120. The processor 130 includes: an indication configuration unit 131, an icon configuration unit 132, a control operation unit 133, and a response interaction unit 134.

The indication configuration unit 131 is configured to determine a ray formed from a predetermined position of a hand to a finger joint of the hand in a state in which four fingers of the hand form a fist as an operation indication line. Here, an end point of the ray is the predetermined position of the hand.

The icon configuration unit 132 is configured to determine a point of intersection between the operation indication line and a display surface in the artificial reality as a position of an operation icon in the artificial reality.

The control operation unit 133 is configured to control the operation icon to move correspondingly in response to detecting that the four fingers of the hand form a fist and move, to move the operation icon in the display surface to a target key. The display 120 is configured to display the display surface.

The response interaction unit 134 is configured to determine, in response to detecting an action of a thumb of the hand touching an index finger of the hand, that the operation icon clicks on the target key to complete interaction.

In an embodiment shown in FIG. 5, the response interaction unit 134 comprises an action unit 134-1 and an effectuation unit 134-2. The response interaction unit 134 is specifically configured to, when determining that the operation icon clicks on the target key to complete interaction in response to detecting an action of a thumb of the hand touching an index finger of the hand:
  determine an index finger joint plane based on joint positions of the index finger; determine a distance between a distal finger pulp of the thumb and the index finger joint plane as a thumb-index-finger spacing;
  trigger the action unit 134-1 in response to detecting that the distal finger pulp of the thumb approaches the index finger joint plane and the thumb-index-finger spacing is smaller than a predetermined clicking distance threshold, wherein the action unit 134-1 is configured to control the operation icon to click on the target key; and
  trigger the effectuation unit 134-2 in response to detecting that the thumb is lifted, the distal finger pulp gets away from the index finger joint plane, and the thumb-index-finger spacing is greater than a predetermined effective distance threshold, wherein the effectuation unit 134-2 is configured to control to complete the action of the operation icon clicking on the target key, and enable the action of the operation icon clicking on the target key to become effective, to complete one interactive action.

Furthermore, a dragging and sliding unit 135 is further included. The dragging and sliding unit 135 can be integrated into the processor 130.

The dragging and sliding unit 135 is configured to: determine, in response to detecting that the hand moves when the thumb-index-finger spacing is smaller than the clicking distance threshold, that an instruction to drag and slide an to-be-dragged-and-slid interface is received, the to-be-dragged-and-slid interface being determined based on a position of the hand when the thumb-index-finger spacing is smaller than the clicking distance threshold; and
determine, in response to detecting that the hand stops moving, the distal finger pulp gets away from the index finger joint plane, and the thumb-index-finger spacing is greater than the predetermined effective distance threshold, that an instruction to stop dragging and sliding the to-be-dragged-and-slid interface is received.

Optionally, the user can complete the interactive action by performing dragging and sliding. The dragging and sliding unit 135 can be configured to, when being response to completing the interactive action by performing dragging and sliding:
  determine an index finger joint plane based on joint positions of an index finger, wherein the joint positions of the index finger may be positions of joints in the index finger;
  determine a distance between a distal finger pulp of the thumb and the index finger joint plane as a thumb-index-finger spacing;
  control the operation icon to press the to-be-dragged-and-slid interface in response to detecting that the thumb-index-finger spacing is smaller than a predetermined clicking distance threshold, and control the to-be-dragged-and-slid interface to be dragged or slid along with the movement of the hand in response to detecting that the hand moves when the thumb-index-finger spacing is smaller than the predetermined clicking distance threshold; and
  determine, in response to detecting that the distal finger pulp gets away from the plane determined by the joints in the index finger when the thumb-index-finger spacing is greater than a predetermined effective distance threshold, that the to-be-dragged-and-slid interface moves to the target position, and control the action of moving the to-be-dragged-and-slid interface to the target position to become effective, to complete one interactive action of dragging or sliding.

It can be seen from the above-mentioned implementations that the gesture interaction system based on artificial reality provided by the present disclosure firstly captures a motion posture of a hand via the camera 110, then determines, by the indication configuration unit 131 in the processor 130, a ray formed from a predetermined position of the hand to a finger joint of the hand in a state in which four fingers of the hand form a fist as an operation indication line, then determines, by an icon configuration unit 132, a point of intersection between the operation indication line and a display surface in the artificial reality displayed by the display as the position of the operation icon in the artificial reality, then controls, by the control operation unit 133, the operation icon to move correspondingly in response to detecting that the four fingers of the hand form a fist and move, to move the operation icon in the display surface to a target key, and then determines, by the response interaction unit 134, in response to detecting an action of a thumb of the hand touching an index finger, that the operation icon clicks on the target key to complete the interaction. Therefore, the thumb touching any point of the index finger can achieve a clicking operation, with low precision requirements, thereby reducing manpower and financial resources. Moreover, due to the low precision requirements, it is easy to perform the clicking operation, greatly improving the user interaction experience.

The gesture interaction method and system based on artificial reality proposed according to the present disclosure are described in the form of examples, referring to the accompanying drawings. However, those skilled in the art should understand that various modifications may be made to the gesture interaction method and system based on artificial reality as set forth in the present disclosure without departing from the contents of the present disclosure. Therefore, the scope of protection of the present disclosure should be determined by the contents of the attached claims.

What is claimed is:
1. A gesture interaction method based on artificial reality, comprising:

determining a ray formed from a predetermined position of a hand to a finger joint of the hand in a state in which four fingers of the hand form a first as an operation indication line, an end point of the ray being the predetermined position of the hand;

determining a point of intersection between the operation indication line and a display surface in the artificial reality as a position of an operation icon in the artificial reality;

controlling the operation icon to move correspondingly in response to detecting that the four fingers of the hand form the first and move, to move the operation icon in the display surface to a target key; and determining, in response to detecting an action of a thumb of the hand touching an index finger of the hand, that the operation icon clicks on the target key to complete an interaction, wherein said determining, in response to detecting the action of the thumb of the hand touching the index finger of the hand, that the operation icon clicks on the target key to complete the interaction comprises:

determining an index finger joint plane based on joint positions of the index finger;

determining a distance between a distal finger pulp of the thumb and the index finger joint plane as a thumb-index-finger spacing;

controlling the operation icon to click on the target key, in response to detecting that the distal finger pulp of the thumb approaches the index finger joint plane and the thumb-index-finger spacing smaller than a predetermined clicking distance threshold; and in response to detecting that the thumb is lifted, the distal finger pulp gets away from the index finger joint plane, and the thumb-index-finger spacing is greater than a predetermined effective distance threshold, controlling to complete the action of the operation icon clicking on the target key, and enabling the action of the operation icon clicking on the target key to become effective, to complete one interactive action, wherein the index finger joint plane comprises all points covered by a plane formed between a distal finger tip of the index finger and an interphalangeal joint of the index finger, between two interphalangeal joints of the index finger, and between an interphalangeal joint and a metacarpal joint of the index finger.

2. The gesture interaction method based on artificial reality according to claim 1, wherein:
the predetermined position of the hand is a wrist joint; and
the finger joint is a joint of the index finger.

3. The gesture interaction method based on artificial reality according to claim 1, wherein said controlling the operation icon to move correspondingly comprises: controlling the operation icon to move according to a moving trajectory of the movement of the four fingers that form the fist.

4. The gesture interaction method based on artificial reality according to claim 1, further comprising:
determining, in response to detecting that the hand moves when the thumb-index-finger spacing is smaller than the clicking distance threshold, that an instruction to drag and slide an to-be-dragged-and-slid interface is received, the to-be-dragged-and-slid interface being determined based on a position of the hand when the thumb-index-finger spacing is smaller than the clicking distance threshold; and
determining, in response to detecting that the hand stops moving, the distal finger pulp gets away from the index finger joint plane, and the thumb-index-finger spacing is greater than the predetermined effective distance threshold, that an instruction to stop dragging and sliding the to-be-dragged-and-slid interface is received.

5. The gesture interaction method based on artificial reality according to claim 4, wherein the clicking distance threshold is equal to the effective distance threshold.

6. A gesture interaction system based on artificial reality, comprising a camera configured to capture a motion posture of a hand, a display configured to display an interaction page, and a processor connected to the camera and the display, wherein the processor comprises:

an indication configuration unit configured to determine a ray formed from a predetermined position of a hand to a finger joint of the hand in a state in which four fingers of the hand form a first as an operation indication line, wherein an end point of the ray is the predetermined position of the hand;

an icon configuration unit configured to determine a point of intersection between the operation indication line and a display surface in the artificial reality as a position of an operation icon in the artificial reality, the display being configured to display the display surface;

a control operation unit configured to control the operation icon to move correspondingly, in response to detecting that the four fingers of the hand form the first and move, to move the operation icon in the display surface to a target key; and a response interaction unit configured to determine, in response to detecting an action of a thumb of the hand touching an index finger of the hand, that the operation icon clicks on the target key to complete an interaction, wherein the response interaction unit comprises an action unit and an effectuation unit, and the response interaction unit is specifically configured to, when determining that the operation icon clicks on the target key to complete the interaction in response to detecting the action of the thumb of the hand touching the index finger of the hand:

determine an index finger joint plane based on joint positions of the index finger;

determine a distance between a distal finger pulp of the thumb and the index finger joint plane as a thumb-index-finger spacing;

trigger the action unit in response to detecting that the distal finger pulp of the thumb approaches the index finger joint plane and the thumb-index-finger spacing is smaller than a predetermined clicking distance threshold, wherein the action unit is configured to control the operation icon to click on the target key; and trigger the effectuation unit in response to detecting that the thumb is lifted, the distal finger pulp gets away from the index finger joint plane, and the thumb-index-finger spacing is greater than a predetermined effective distance threshold, wherein the effectuation unit is configured to control to complete the action of the operation icon clicking on the target key, and enable the action of the operation icon clicking on the target key to become effective, to complete one interactive action, wherein the index finger joint plane comprises all points covered by a plane formed between a distal finger tip of the index finger and an interphalangeal joint of the index finger, between two interphalangeal joints of the index finger, and between an interphalangeal joint and a metacarpal joint of the index finger.

7. The gesture interaction system based on artificial reality according to claim 6, wherein:

the predetermined position of the hand is a wrist joint; and the finger joint is a joint of the index finger.

8. The gesture interaction system based on artificial reality according to claim 6, wherein said controlling the operation icon to move correspondingly comprises: controlling the operation icon to move according to a moving trajectory of the movement of the four fingers that form the fist.

9. The gesture interaction system based on artificial reality according to claim 6, further comprising a dragging and sliding unit configured to:
- determine, in response to detecting that the hand moves when the thumb-index-finger spacing is smaller than a predetermined clicking distance threshold, that an instruction to drag and slide an to-be-dragged-and-slid interface is received, the to-be-dragged-and-slid interface being determined based on a position of the hand when the thumb-index-finger spacing is smaller than the clicking distance threshold; and
- determine, in response to detecting that the hand stops moving, the distal finger pulp of the thumb gets away from the index finger joint plane, and the thumb-index-finger spacing is greater than a predetermined effective distance threshold, that an instruction to stop dragging and sliding the to-be-dragged-and-slid interface is received.

10. The gesture interaction system based on artificial reality according to claim 9, wherein the clicking distance threshold is equal to the effective distance threshold.

* * * * *